United States Patent
Huber et al.

(10) Patent No.: US 6,276,744 B1
(45) Date of Patent: Aug. 21, 2001

(54) ROLL-TYPE DOOR OPENER

(75) Inventors: William B. Huber, DeBary, FL (US); William H. Slavik, Palos Hills, IL (US)

(73) Assignee: Technical Products Group, Inc., Lombard, IL (US)

( * ) Notice: Subject to any disclaimer, the term of this patent is extended or adjusted under 35 U.S.C. 154(b) by 0 days.

(21) Appl. No.: 09/598,346

(22) Filed: Jun. 21, 2000

(51) Int. Cl.[7] .............................. A62D 25/00; B60J 5/06; E05D 15/00
(52) U.S. Cl. .......................... 296/155; 296/52; 160/201; 160/181; 160/26
(58) Field of Search ................................ 296/50, 52, 155, 296/183; 160/23.1, 19, 26, 201, 188

(56) References Cited

U.S. PATENT DOCUMENTS

| | | |
|---|---|---|
| 4,016,920 | 4/1977 | Shepard . |
| 4,018,259 * | 4/1977 | Herms ................................. 160/26 |
| 4,621,862 | 11/1986 | Kramer . |
| 4,860,813 | 8/1989 | Ballyns et al. . |
| 5,056,847 * | 10/1991 | Stiwell et al. ......................... 296/50 |
| 5,429,170 | 7/1995 | Nogaki . |
| 5,443,300 | 8/1995 | Mohammed . |
| 5,544,690 * | 8/1996 | Margo et al. ...................... 160/23.1 |
| 5,572,829 * | 11/1996 | Stoltenberg ......................... 160/201 |
| 5,698,073 | 12/1997 | Vincenzi . |
| 5,803,149 * | 9/1998 | Halley et al. ....................... 160/201 |

* cited by examiner

Primary Examiner—D. Glenn Dayoan
Assistant Examiner—Hilary Gutman
(74) Attorney, Agent, or Firm—Brinks Hofer Gilson & Lione

(57) ABSTRACT

A door opener for a roll-type door in a cargo van includes a shaft that is mounted for rotation within the cargo van body and is coupled with the door such that shaft rotation causes the door to move between opened and closed positions. The shaft is rotated by a motor that is mounted outside of the cargo van body and is coupled to the rotatable shaft by a drive system that extends through the cargo van body. This arrangement allows a relatively large conventional motor to be used without extending into the door opening or compromising the height of the door opening.

14 Claims, 8 Drawing Sheets

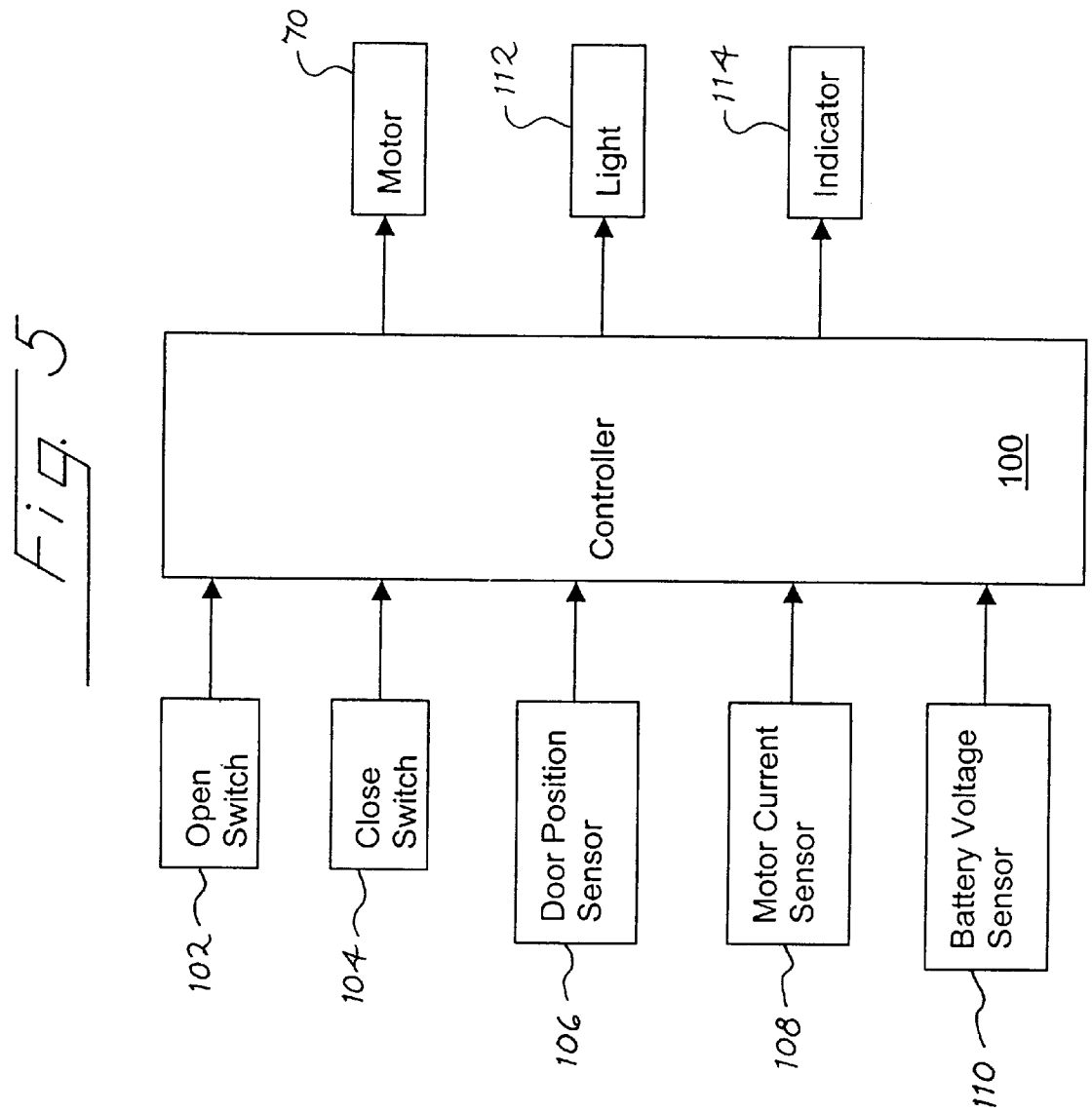
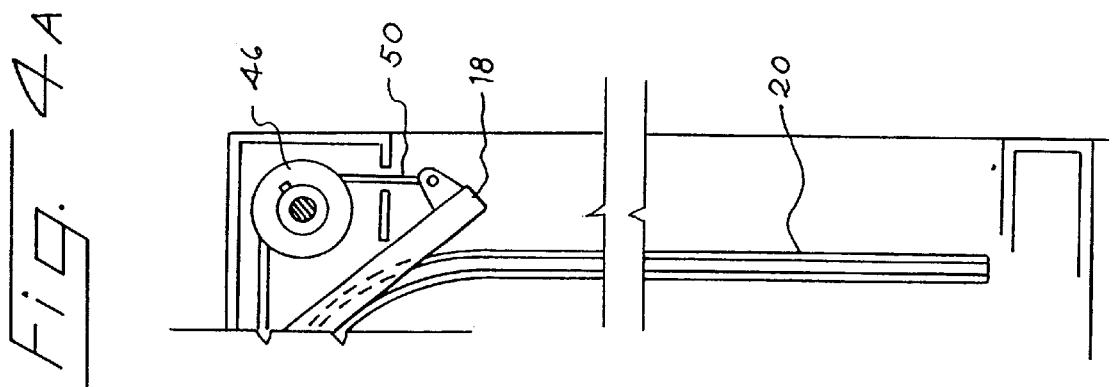

ROLL-TYPE DOOR OPENER

BACKGROUND

The present invention relates to a door opener for a roll-type door in a cargo van, and in particular to such an opener that maximizes the usable interior space of the cargo van.

Ballyns U.S. Pat. No. 4,860,813 discloses a door opener for a roll-up door in a cargo van. In the disclosed system, the door is coupled via flexible winding straps to a drum mounted on a rotatable shaft inside the cargo van above the door opening. A motor is also mounted inside the cargo van above the door opening to rotate the drum and thereby to control the position of the door.

This approach requires both the rotatable shaft and the motor to be positioned within the cargo van above the door opening, and this requirement has drawbacks in many applications. In particular, if a conventionally sized motor is used, in at least some cases the size requirements for the rotatable shaft and the motor for driving the shaft are such that the top of the door opening must be placed at a lower than optimal position in the cargo van. Alternatively, if this disadvantage is to be avoided, a non-standard, relatively expensive motor may be required.

The present invention is directed to an improved door opener that avoids these disadvantages of the prior art.

BRIEF SUMMARY

By way of introduction, the preferred embodiment described below is a door opener mounted to a cargo van having a cargo van body and a door opening in the body closable with a roll-type door.

The disclosed embodiment includes a shaft mounted for rotation within the cargo van body. The shaft is coupled with the door such that shaft rotation causes the door to move between closed and opened positions. The shaft is driven by a motor that is mounted outside of the cargo van body. This motor is coupled with the shaft by a drive system that extends through the cargo van body to couple the motor and the shaft such that rotation of the motor causes rotation of the shaft and thereby movement of the door.

By positioning the shaft inside the cargo van body and the motor outside the cargo van body, the disclosed door opener optimizes space utilization within the cargo van above the door opening. In particular, a conventional, relatively large-diameter motor can be used to drive the rotatable shaft, without requiring the door opening to be lowered below its optimal position. In this way, all of the advantages of a motorized door opener are provided while minimizing compromises in terms of the size of the door opening and the effective utilization of the internal volume of the cargo van.

These paragraphs have been provided by way of introduction, and they are not intended to limit the scope of the following claims.

BRIEF DESCRIPTION OF THE DRAWINGS

FIG. 4a is a view in the plane of FIG. 3 showing the cargo van of FIG. 1 with the door in the opened position.

FIG. 5 is a block diagram of a controller suitable for use with the door opener of FIGS. 1–4.

FIGS. 8a–8c form a schematic diagram of one implementation of the controller of FIG. 5.

DETAILED DESCRIPTION OF THE PRESENTED PREFERRED EMBODIMENTS

Figure 1:
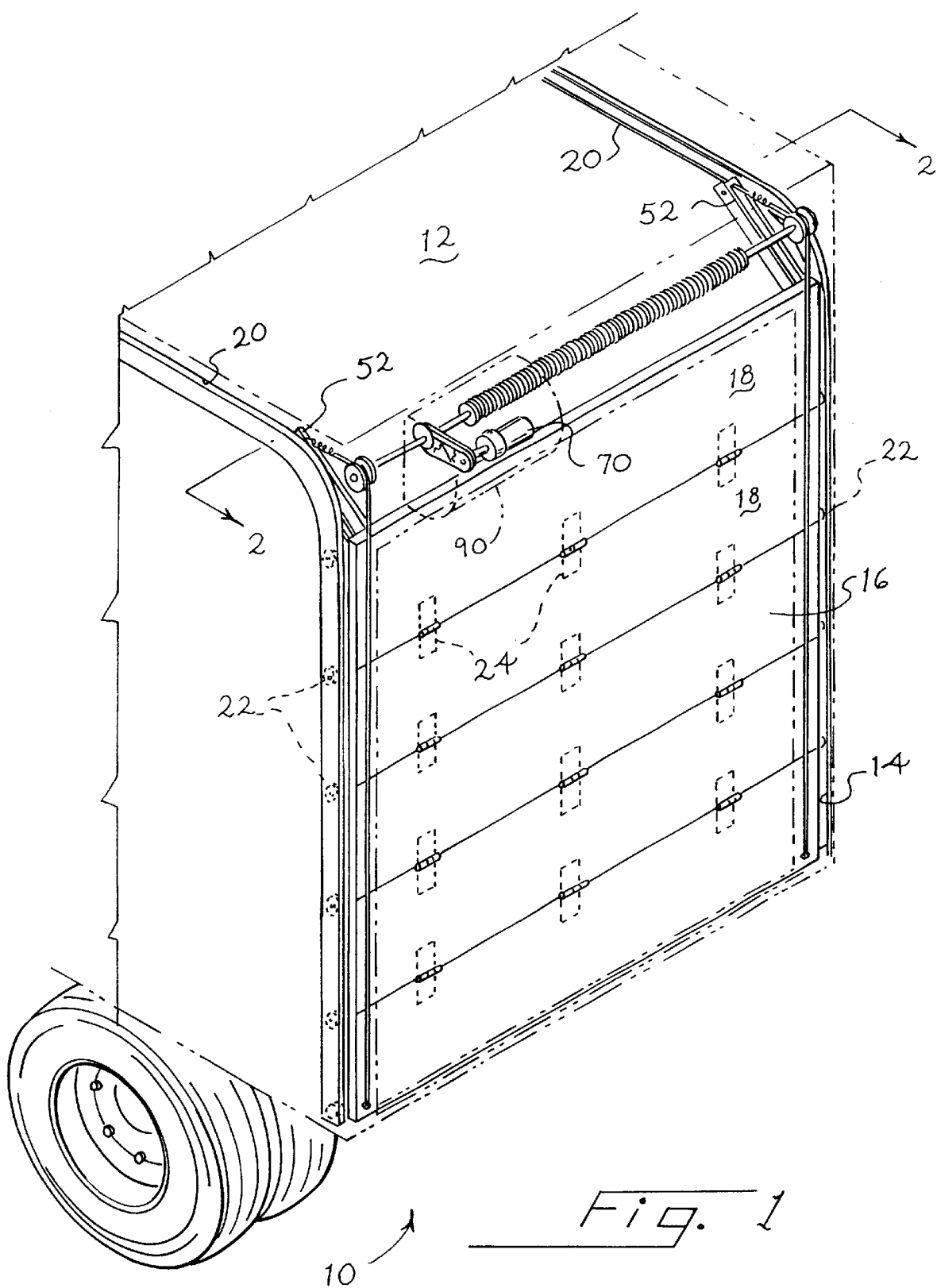
FIG. 1 is a rear perspective view of a cargo van that incorporates a preferred embodiment of the door opener of this invention.

Turning now to the drawings, FIG. 1 shows a rear view of a cargo van 10 that includes a cargo van body 12 that defines an opening 14. The term "cargo van" is intended broadly to encompass cargo storage containers for a wide variety of trucks and trailers, including for example delivery vans and semi-trailers.

The opening 14 is closable with a roll-type door 16 made up of a plurality of articulated door panels 18 that are guided by respective rollers 22 in tracks 20 mounted to the sides of the cargo van body 12. Adjacent ones of the door panels 18 are secured together by hinges 24. The elements 10–24 are conventional, and may be formed for example as described in Ballyns U.S. Pat. No. 4,860,813. One suitable cargo van body 12 may be obtained from Utilimaster (Waukarusa, Ind.), and a suitable roll-type door 16 can be obtained from Whiting Company (Akron, N.Y.).

In FIG. 1 the door 16 is shown in a closed position, in which the door 16 closes the opening 14. The door 16 is movable along the tracks 20 to an opened positioned (not shown) in which the door 16 is positioned above the opening 14, generally parallel to the top of the cargo van body 12.

The Door Opener

Figure 3:
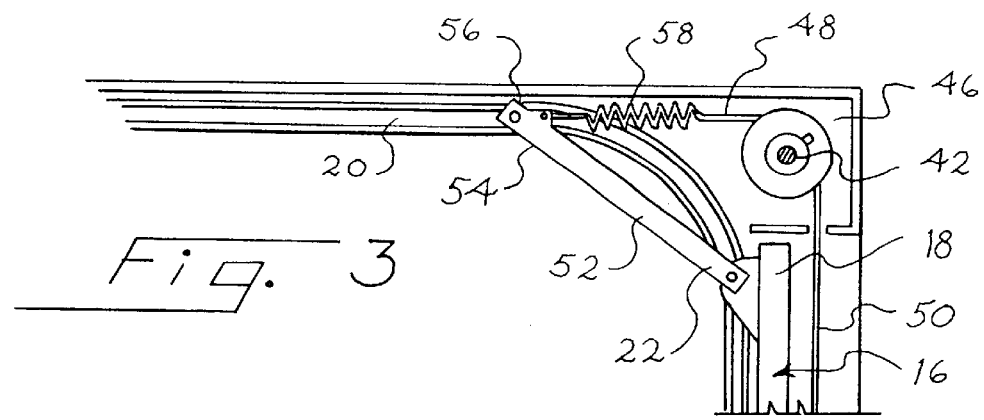
FIG. 3 is a longitudinal sectional view taken along line 3—3 of FIG. 2.
Figure 4:
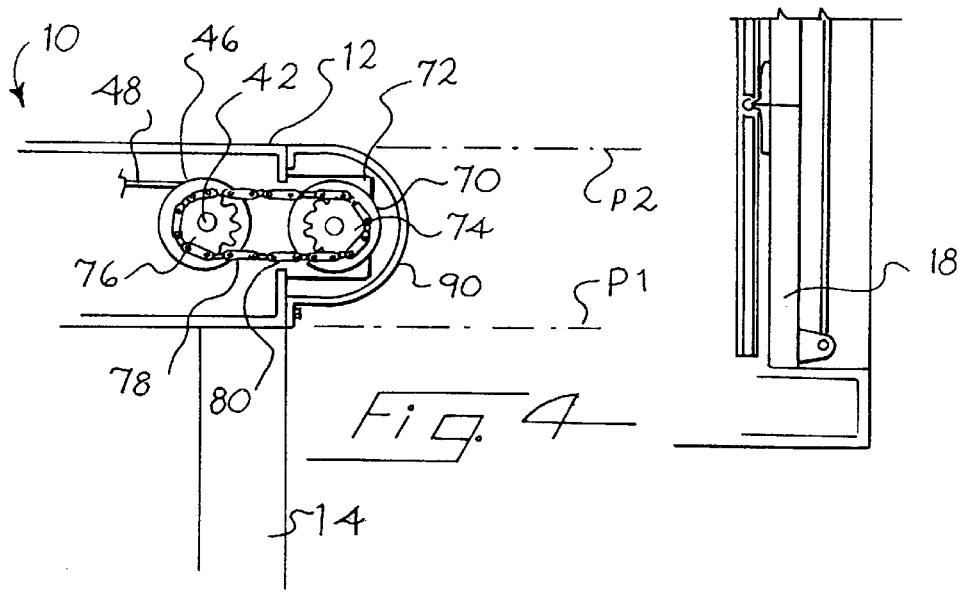
FIG. 4 is a longitudinal sectional view taken along line 4—4 of FIG. 2.
Figure 2:
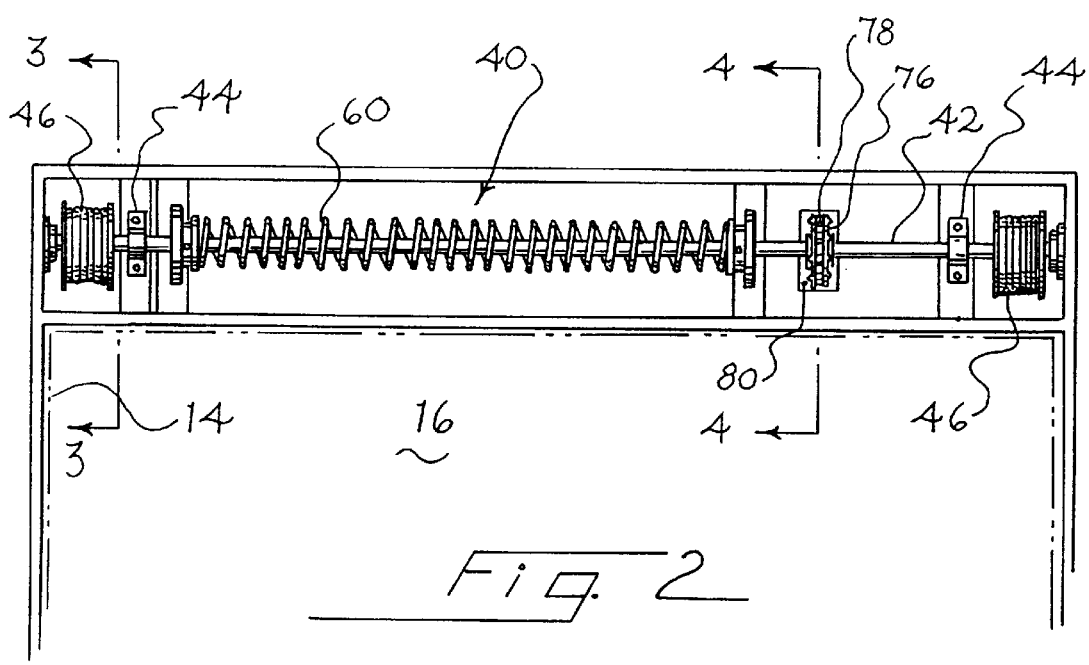
FIG. 2 is a cross-sectional view taken along line 2—2 on FIG. 1.

As shown in FIGS. 2–4, a door opener 40 for the door 16 includes a shaft 42 that is rotatably mounted in journals 44 to extend parallel to and above the opening 14. Two drums 46 are fixed to the shaft 42, and two straps 48, 50 are wound around each of the drums 46 in opposite winding directions.

Each of the first straps 48 is coupled with the upper door panel 18 by a respective strut 52 (FIG. 3). Each strut 52 includes a roller 54 at its upper end that is guided by the respective track 20. The lower end of each strut 52 is articulated at the shaft of the roller 22 positioned at the upper edge of the upper door panel 18. The upper end of each of the struts 52 supports an eye-bolt 56 and the respective first strap 48 is connected to each eye-bolt 56 via an extension spring 58. Each of the second straps 50 is connected to the lower portion of the lowermost door panel 18.

Because the straps 48, 50 are wound in opposite directions on the drums 46, rotation of the shaft 42 in a clockwise direction (as shown in FIG. 3) will wind up the first straps 48 and pay out the second straps 50, thereby moving the door 16 toward the closed position of FIG. 3. Conversely, rotation of the shaft 42 in the counter-clockwise direction (as shown in FIG. 3) will pay out the first straps 48 and wind up the second straps 50, thereby moving the door 16 along with tracks 20 toward the opened position of FIG. 4a. The extension springs 58 maintain the first and second straps 48, 50 properly tensioned, in spite of changes in the geometry associated with movement of the struts 52 and the door panels around the curved section of the tracks 20.

A torsion spring 60 is mounted around the shaft 42 (FIG. 2). The torsion spring 60 has a first end that is fixed in place to the cargo van body 12 and a second end that rotates with the shaft 42 and is held in place by a set screw. The set screw allows the torque provided by the torsion spring 60 to be adjusted to counteract a substantial fraction of the total weight of the door 16.

The rotational position of the shaft 42 is controlled by a motor 70 that is adjustably mounted by a bracket 72 positioned outside the cargo van body 12 and secured to the frame of the cargo van 10 (FIG. 4). A sprocket 74 is mounted on the output shaft of the motor 70, and a sprocket 76 is mounted on the shaft 42 in alignment with the sprocket 74. An endless-loop chain 78 extends around the sprockets 74, 76, passing through an opening 80 in the cargo van body 12. The motor 70 is preferably a reversible motor that can be powered in a first direction to open the door 16 and in a second direction to close the door 16. The motor 70 can be activated by any suitable motor controller, including the controller described in the following section. It should be clearly understood however that the door opener of this invention is not limited to use with the controller described below, and many alternatives are possible.

An enclosure 90 is secured to the cargo van body 12 around the motor 70 and the outer portions of the drive system including the sprocket 74. This enclosure 90 provides weather protection for the motor 70 and effectively closes the opening 80 in the cargo van body 12.

As best shown in FIG. 4, the motor 70, the shaft 42 and the enclosure 90 are all positioned above a horizontal plane P1 aligned with the top of the door opening 14. Also, all of these elements are positioned below a maximum-height horizontal plane P2 aligned with the uppermost portion of the cargo van body 12. Thus, the door opener 40 does not increase the overall height of the cargo van body 12, and it does not intrude into the region of the opening 14.

Since the motor 70 is positioned outside of the cargo van body 12, a conventional, relatively large motor 70 can be used without compromising the size of the opening 14 or intruding into the opening 14. Because the shaft 42, the drums 46, and the associated elements are positioned inside the cargo van body 12, they can readily be coupled with the door 16 in an efficient manner. By dividing the door opener 40 into two portions, one of which is positioned outside of the cargo van body 12, a particularly space-efficient door opener is provided that achieves all of the advantages of a door opener having an internally mounted shaft 42, while avoiding the disadvantages associated with an internally mounted motor.

The Controller

FIG. 5 shows a block diagram of a controller 100 suitable for use in controlling the door opener 40 described above. The controller 100 receives input signals from open and close switches 102, 104 that are used by an operator to command the door into the opened and closed positions, respectively. In some embodiments, two sets of switches 102, 104 may be provided, one in the cab of the van 10, and the other within the van body 12. Any suitable switches can be used, including simple mechanical switches.

The other input signals to the controller 100 are supplied by a door position sensor 106, a motor current sensor 108 and a battery voltage sensor 110. The door position sensor 106 provides a two-state sensor signal that is in a first state when the door 16 is in the closed position shown in FIG. 1 and is in a second state otherwise. The door position sensor 106 can be implemented by wide variety of mechanical and optical switches, including standard limit switches. The motor current sensor 108 supplies a signal to the controller 100 indicative of the current drawn by the motor 70. In the conventional way, this current will rise sharply when the motor 70 applies a sharply increased torque at its output shaft. The battery voltage sensor 110 supplies a voltage signal to the controller 100 indicative of the voltage of the battery that supplies power to the motor 70 and the controller 100.

The controller 100 processes the input signals described above to control the motor 70 as well as to control a van light 112 positioned within the cargo van body 12 and an indicator lamp 114 positioned inside the cab of the van 10. The van light 112 can be any suitable light such as a dome light that illuminates the interior of the cargo van body 12 to allow cargo to be stowed. The indicator lamp 114 can be a simple LED indicator that is used by the controller 100 as described below to indicate that the door 16 is not in the closed position.

Figure 6:
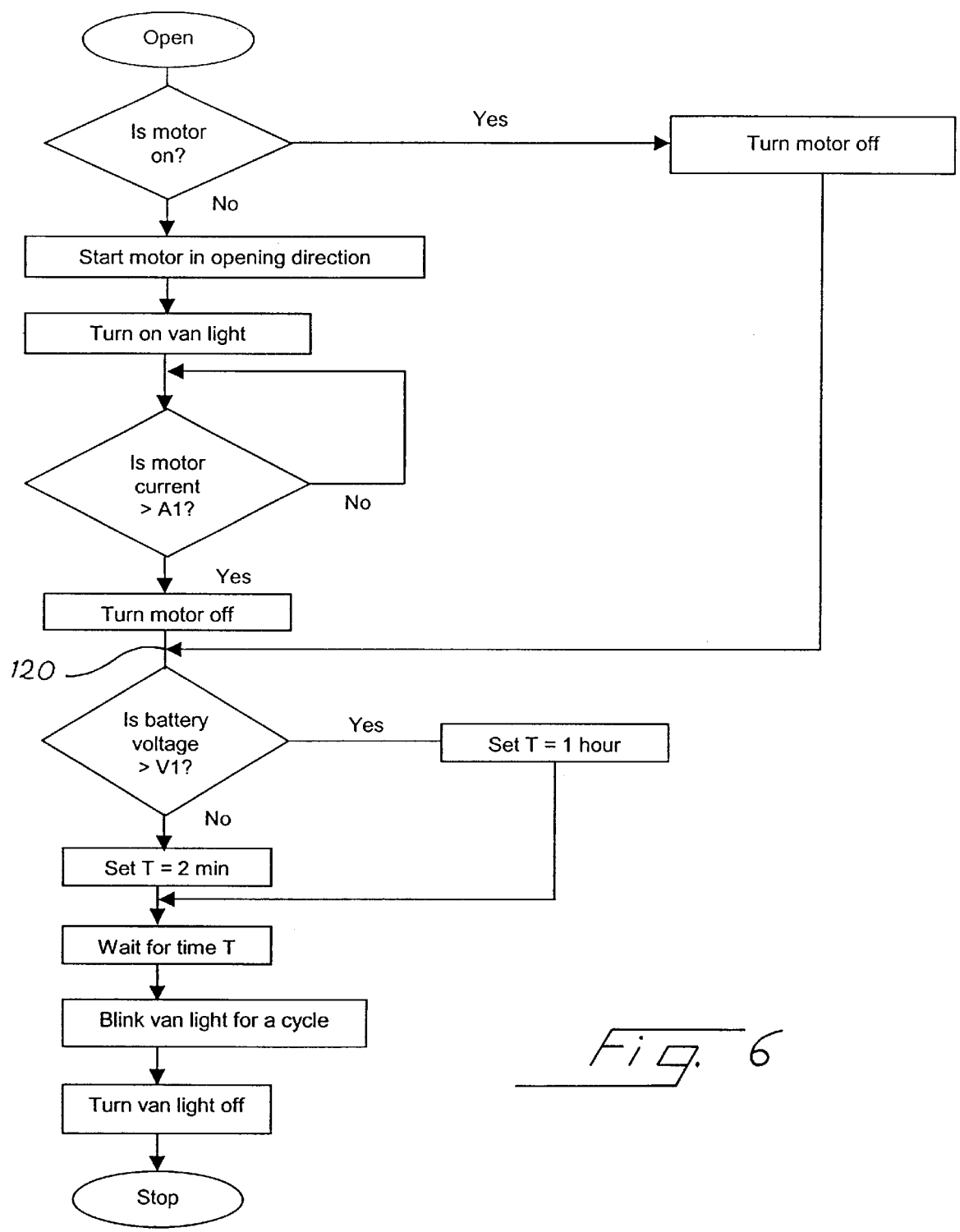
FIGS. 6 and 7 are flow charts illustrating operation of the controller of FIG. 5 when the open and close switches are activated, respectively.
Figure 7:
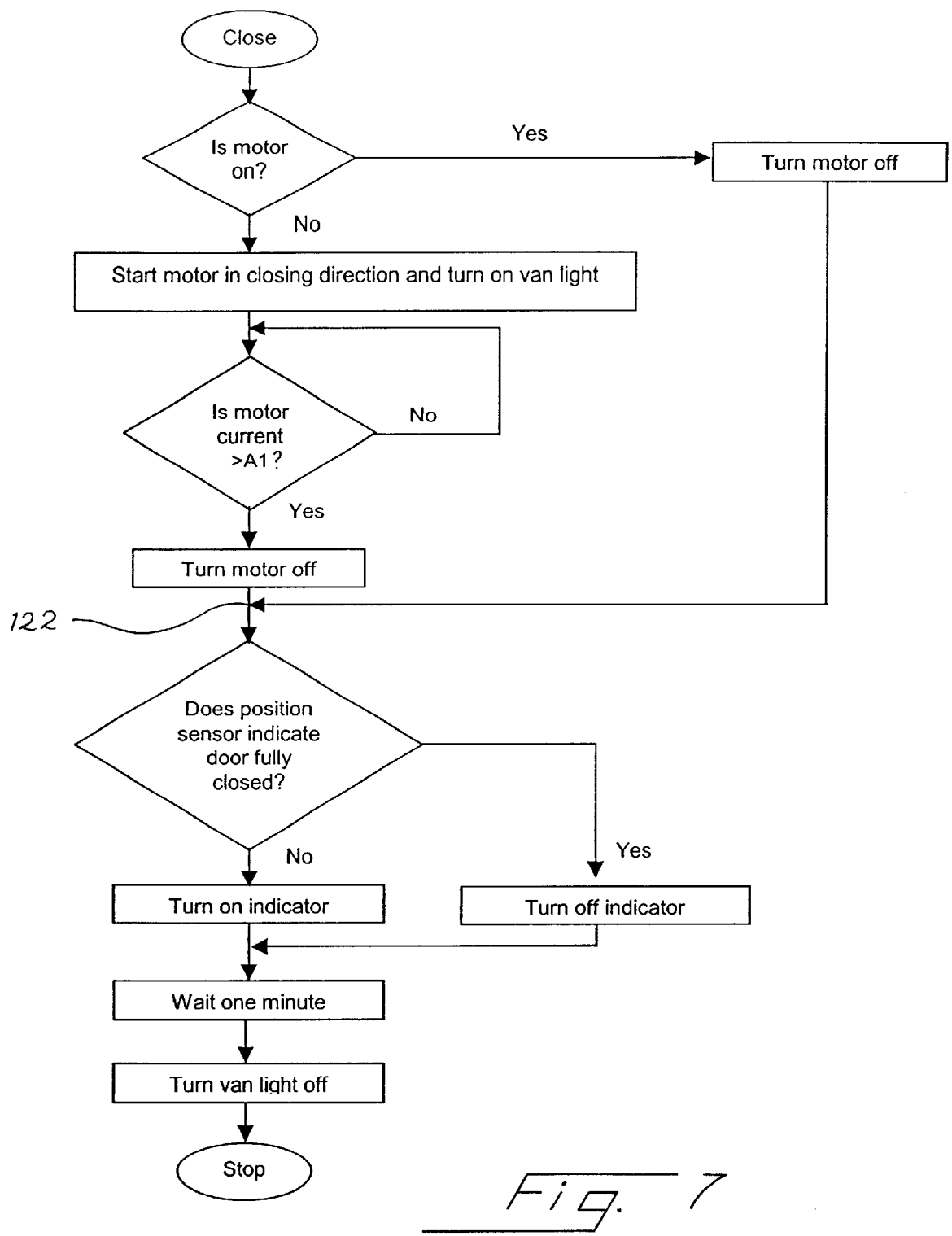
Figure 6A:
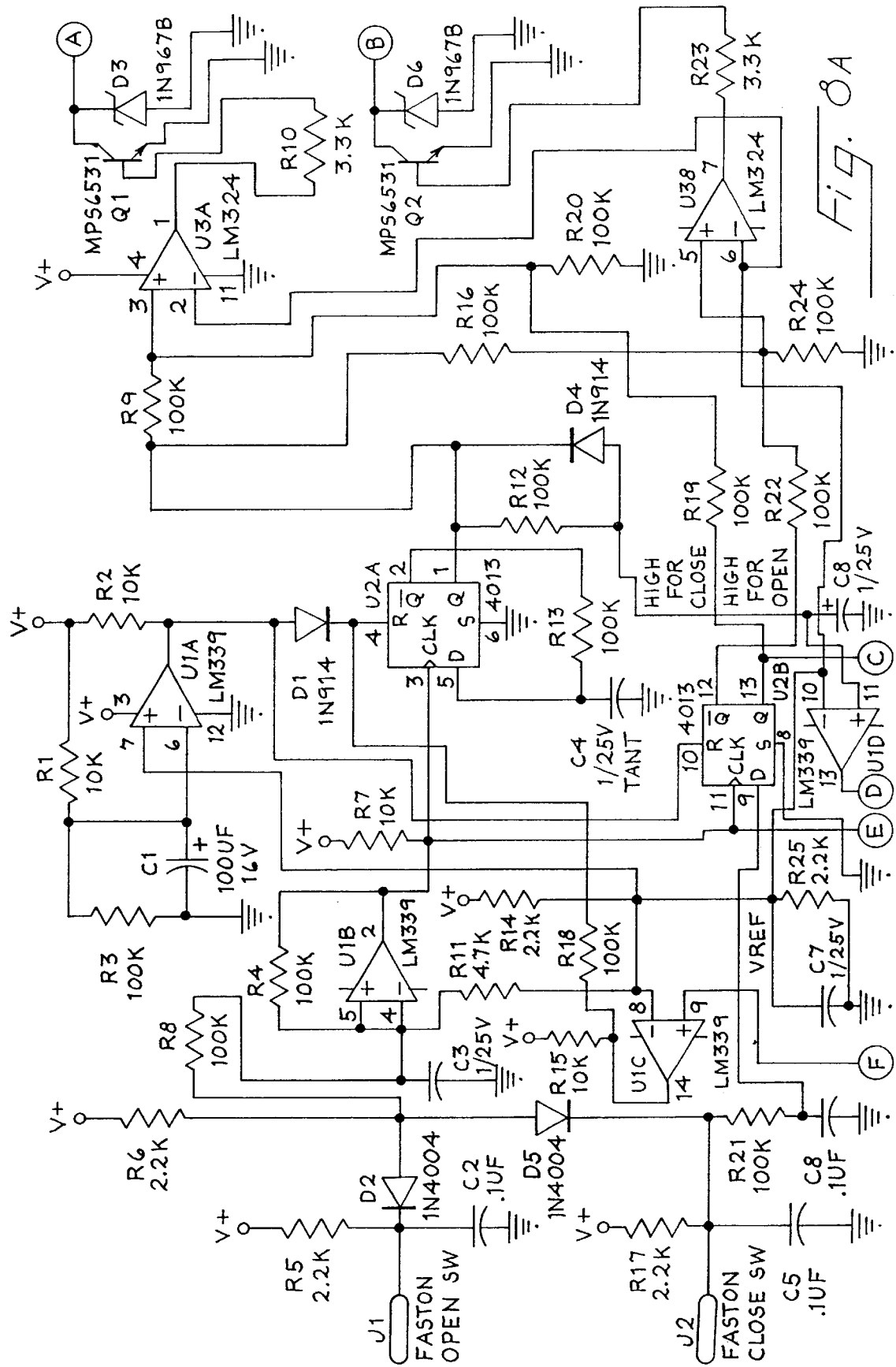
Figure 8B:
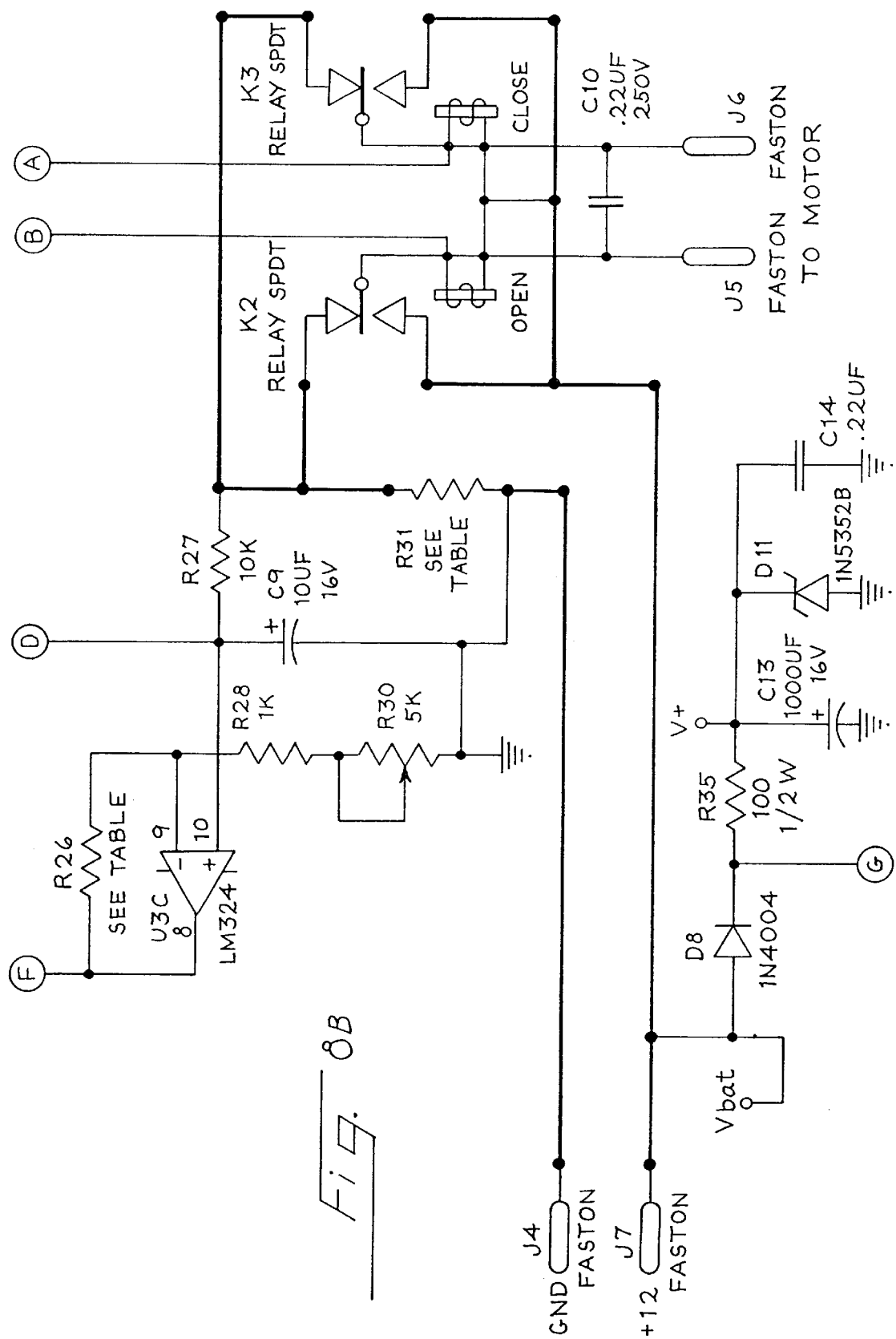
Figure 8C:
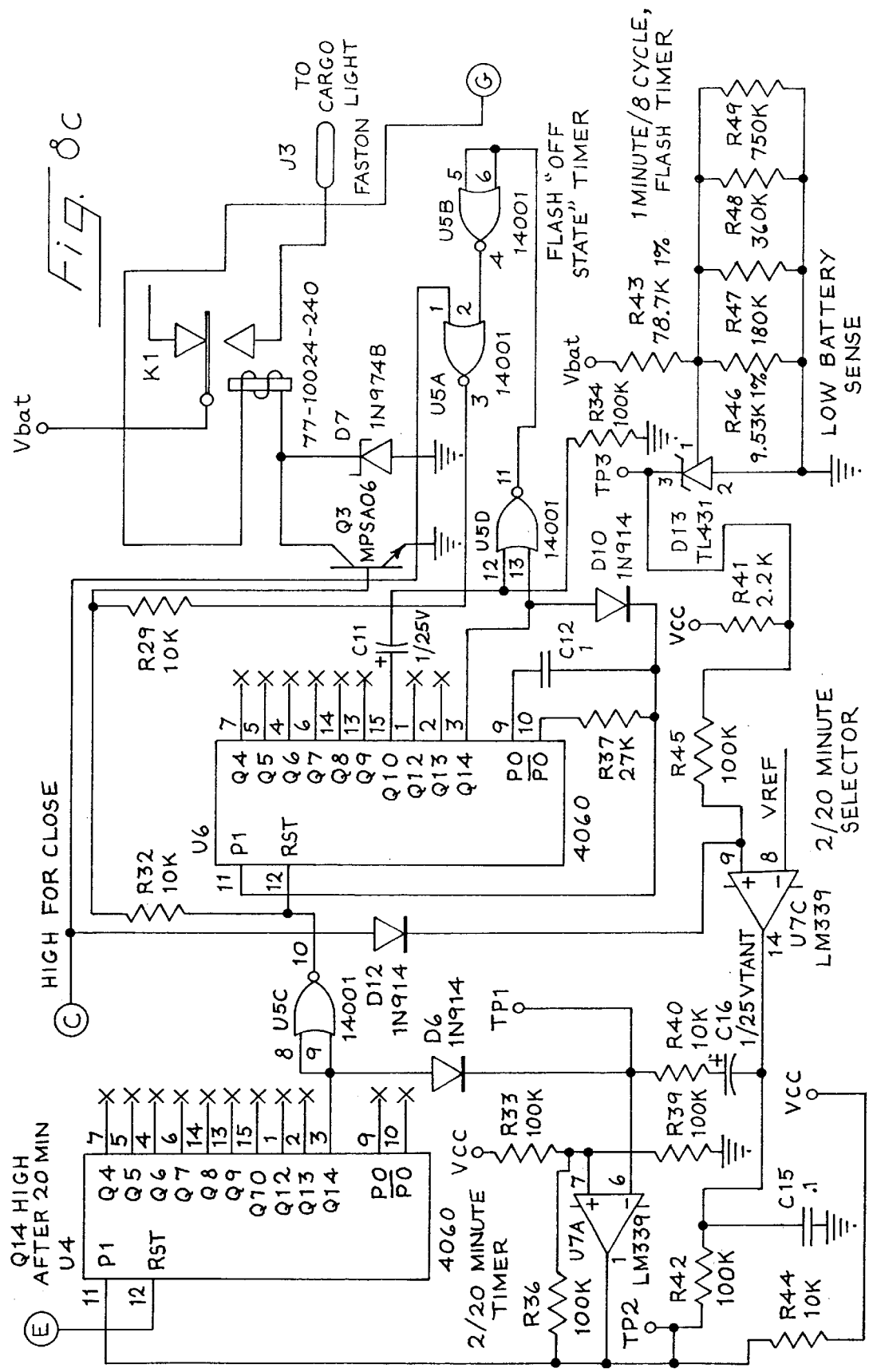

The controller 100 can be implemented in a wide range of technologies, including analog circuit components, digital circuit components, and programmed processors. FIGS. 6 and 7 illustrate operation of the controller 100 in response to closure of the open and close switches 102, 104, respectively, and FIGS. 8a—8c provides a detailed schematic diagram of one embodiment of the controller 100. Nodes A—F of FIG. 8a are connected to nodes A–F, respectively of FIGS. 8b and 8c, and node G of FIG. 8b is connected to node G of FIG. 8c.

As shown in FIG. 6, when the open switch 102 is closed, the controller 100 first checks to determine if the motor 70 is already running. If so, the closure of the open switch 102 is taken as an indication of a problem, and the motor 70 is turned off before transferring control to node 120.

If the motor 70 is not running at the time the open switch 102 is closed, the controller 100 starts the motor 70 in a door-opening direction and turns on the van light 112. The controller 100 then monitors the motor current sensor signal and compares it with a threshold A1. The motor is allowed to keep running until the motor current sensor signal exceeds the threshold A1. This is an indication that the door 16 has met an obstruction, and the controller 100 then turns off the motor 70.

Regardless of whether the motor 70 was on or off when the open switch 102 was closed, the controller 100 then checks to determine whether the battery voltage sensor signal is greater or less than a threshold V1, which may, for example, be equal to 12 volts. If so, a variable T is set to a longer time (e.g., 1 hour); otherwise the variable T is set to a shorter time (e.g., 2 minutes). The controller 100 waits for a time equal to the variable T and then blinks the van light 112 through a cycle (for example, turning off the van light 112 briefly for 8 times within a 1 minute interval) before turning off the van light 112.

The van light 112 facilitates cargo loading and unloading after the door 16 has reached the opened position, and the blink cycle alerts anyone inside the cargo van body 12 that the van light is about to go off. Automatically shutting off the van light 112 prevents the van light 112 from discharging the cargo van battery to a point where the truck won't start. By automatically adjusting the duration of cargo light illumination based on the voltage of the battery, further discharging of the battery is prevented in a low voltage, i.e., low battery charge, condition.

As shown in FIG. 7, when the close switch 104 is closed, the controller 100 first checks to determine if the motor 70 is running. If so, the current closure of the close switch 104 is taken as an indication of a problem, and the motor 70 is turned off before control is transferred to the node 122.

Otherwise, the motor 70 is started in the door-closing direction and the van light is turned on. The controller 100 then monitors the motor current, and allows the motor 70 to run until the motor current exceeds the threshold A1. At this point, the motor 70 is turned off. During normal operation, this will cause the motor 70 to move the door to the closed position before the motor 70 is turned off. Alternatively, if there is some obstruction under the door 16 that prevents the door 16 from reaching the closed position, the motor 70 will be turned off when the door 16 reaches the obstruction.

The controller 100 then checks the door position sensor signal to determine whether the door 16 is fully closed. If the door is fully closed, the controller turns off the indicator lamp 114. If the door is not fully closed, the controller turns on the indicator lamp 114. The controller then waits 1 minute before turning off the van light 112. The indicator lamp 114 alerts the drive in the cab of the truck that the door 16 is not fully closed. By leaving the van light 112 on for 1 minute after the motor 70 has been turned off, a person trapped inside the cargo van body 12 is given time to find and reach a switch in the cargo van body 12 to open the door 16.

Various features implemented by the controller 100 can be used independently of one another. Also, many variations are possible. For example, a remote-controlled switch such as a conventional keyless entry system can be used to provide the open and close input signals, thereby adding to the convenience of operation of the controller 100.

Conclusion

Of course, it should be understood that a wide range of changes and modifications can be made to the preferred embodiment described above. Instead of the chain and sprocket arrangement shown, the drive system can include drive belts, cables or shafts. The motor used to power the door opener may be electrically or hydraulically powered, and the motor may be mounted at either the top or the back of the cargo van body. The straps may be implemented as wire cables, and the straps may be coupled with the door either directly or indirectly. As used herein, the strap is said to be coupled with the door whether or not an extension spring or other elements are interposed between the strap and the door.

The foregoing detailed description has discussed only a few of the many forms that the present invention can take. For this reason, this detailed description is intended by way of illustration and not by way of limitation. It is only the following claims, including all equivalents, that are intended to define the scope of this invention.

What is claimed is:

1. In combination with a cargo van comprising a cargo van body, a door opening in the cargo van body, and a roll-type door movable between an opened position in which the door is positioned in the cargo van above the door opening, and a closed position in which the door closes the door opening, a door opener comprising:
    a shaft mounted for rotation within the cargo van body, said shaft coupled with the door such that shaft rotation causes the door to move between the closed and opened positions;
    a motor mounted outside the cargo van body; and
    a drive system extending through the cargo van body to couple the motor and the shaft such that rotation of the motor causes rotation of the shaft and movement of the door.

2. The invention of claim 1 wherein the drive system comprises a first sprocket coupled with the shaft inside the cargo van body, a second sprocket coupled with the motor outside the cargo van body, and an endless loop chain passing through the cargo van body and coupling the first and second sprockets.

3. The invention of claim 2 further comprising an enclosure mounted outside the cargo van body around the motor to provide weather protection for the motor and the drive system.

4. The invention of claim 1 wherein the cargo van comprises a pair of tracks that guide the door between the opened and closed positions, and wherein the shaft is coupled to the door by a first strap coupled between an upper portion of the door and the shaft, and by a second strap coupled between a lower portion of the door and the shaft.

5. The invention of claim 4 wherein the shaft and the motor are positioned above a horizontal plane aligned with a top of the door opening.

6. The invention of claim 4 wherein the door comprises a plurality of articulated door panels, each door panel comprising at least one roller on each side of the door panel coupled to move along respective track.

7. The invention of claim 6 wherein the door further comprises a strut pivotably coupled to an uppermost one of the door panels, said strut comprising at least one additional roller coupled to move along the respective track, said first strap secured to the strut.

8. The invention of claim 4 further comprising a spring having a first end connected to one of the straps and a second end coupled with the respective upper portion of the door.

9. The invention of claim 1 wherein the motor extends rearwardly of the cargo van body.

10. The invention of claim 9 wherein an uppermost portion of the cargo van body defines a maximum-height horizontal plane, and wherein the motor and the drive system are disposed entirely below the maximum-height horizontal plane.

11. The invention of claim 1 further comprising:
    a motor current sensor operative to generate a current sensor signal indicative of current drawn by the motor; and
    a controller responsive to the current sensor signal, said controller operative to stop the motor when the current sensor signal crosses a current threshold value.

12. The invention of claim 11 further comprising:
    a door position sensor operative to generate a position sensor signal indicative of whether the door is in the closed position; and
    an indicator;
    said controller also responsive to the position sensor signal and coupled with the indicator; said controller operative to actuate the indicator when the position sensor signal indicates that the door is not in the closed position.

13. The invention of claim 1 further comprising:
    a cargo van light mounted in the cargo van body;
    a controller operative to turn on the cargo van light during operation of the motor, said controller operative to maintain the light on after the door reaches the opened position for a selected time period, to blink the light repeatedly after the selected time period, and then to turn off the light.

14. The invention of claim 13 wherein the controller is operative to vary duration of the selected time period in response to a voltage signal indicative of a battery voltage associated with the cargo van.

* * * * *

UNITED STATES PATENT AND TRADEMARK OFFICE
CERTIFICATE OF CORRECTION

PATENT NO. : 6,276,744 B1  
DATED : August 21, 2001  
INVENTOR(S) : William B. Huber et al.

Page 1 of 1

It is certified that error appears in the above-identified patent and that said Letters Patent is hereby corrected as shown below:

<u>Column 6,</u>  
Line 18, after "along" insert -- the --.

Signed and Sealed this

Twenty-eighth Day of May, 2002

Attest:

*Attesting Officer*

JAMES E. ROGAN  
*Director of the United States Patent and Trademark Office*